United States Patent
Guan et al.

(10) Patent No.: US 12,438,231 B2
(45) Date of Patent: Oct. 7, 2025

(54) META-ARAMID POLYMER WITH GRID STRUCTURE, AND PREPARATION METHOD THEREFOR AND USE THEREOF

(71) Applicants: YANTAI TAYHO ADVANCED MATERIALS RESEARCH INSTITUTE CO., LTD, Yantai (CN); TAYHO BATTERY MATERIALS TECHNOLOGY CO., LTD, Yantai (CN)

(72) Inventors: Zhenhong Guan, Yantai (CN); Ming Jiang, Yantai (CN); Dan Li, Yantai (CN); Xiquan Song, Yantai (CN)

(73) Assignees: YANTAI TAYHO ADVANCED MATERIALS RESEARCH INSTITUTE CO., LTD, Yantai (CN); TAYHO BATTERY MATERIALS TECHNOLOGY CO., LTD, Yantai (CN)

( * ) Notice: Subject to any disclaimer, the term of this patent is extended or adjusted under 35 U.S.C. 154(b) by 0 days.

(21) Appl. No.: 19/002,082

(22) Filed: Dec. 26, 2024

(65) Prior Publication Data
US 2025/0158225 A1    May 15, 2025

Related U.S. Application Data

(63) Continuation of application No. PCT/CN2023/096447, filed on May 26, 2023.

(30) Foreign Application Priority Data

Feb. 23, 2023    (CN) .......................... 202310152199.9

(51) Int. Cl.
| | |
|---|---|
| C09D 7/65 | (2018.01) |
| C08G 69/28 | (2006.01) |
| C08G 69/32 | (2006.01) |
| C09D 7/20 | (2018.01) |
| C09D 7/61 | (2018.01) |
| C09D 177/06 | (2006.01) |
| H01M 50/406 | (2021.01) |
| H01M 50/423 | (2021.01) |

(52) U.S. Cl.
CPC .......... *H01M 50/423* (2021.01); *C08G 69/28* (2013.01); *C08G 69/32* (2013.01); *C09D 7/20* (2018.01); *C09D 7/61* (2018.01); *C09D 7/65* (2018.01); *C09D 177/06* (2013.01); *H01M 50/406* (2021.01)

(58) Field of Classification Search
CPC .. H01M 50/243; H01M 50/406; C08G 69/28; C08G 69/32; C09D 7/20; C09D 7/61; C09D 7/65; C09D 177/06
USPC ...................................... 264/171.23
See application file for complete search history.

(56) References Cited

U.S. PATENT DOCUMENTS

| | | | |
|---|---|---|---|
| 2012/0168983 A1* | 7/2012 | Zhong | ................. C08G 69/32 264/184 |
| 2019/0343216 A1 | 11/2019 | Huffa et al. | |
| 2021/0031135 A1 | 2/2021 | Coignet et al. | |
| 2023/0323045 A1 | 10/2023 | Hobbs et al. | |

FOREIGN PATENT DOCUMENTS

| | | |
|---|---|---|
| CN | 107170942 A | 9/2017 |
| CN | 110565374 A | 12/2019 |
| CN | 115873238 A | 3/2023 |

OTHER PUBLICATIONS

Internation Search Report of PCT/CN2023/096447, Mailed Aug. 14, 2023.

* cited by examiner

*Primary Examiner* — Hannah J Pak

(57) ABSTRACT

In the process of forming the meta-aramid polymer, alkyl is introduced among macromolecules through alkylation, such that adjacent molecular chains are linked by a chemical bond so as to form a grid structure. A coating slurry prepared from the meta-aramid polymer with a grid structure, a pore-forming agent and a cosolvent are coated on the surface of a polyolefin porous separator so as to obtain a high-performance lithium battery coated separator. Compared with a coated separator prepared by a traditional method, the coated separator prepared by the present disclosure has higher heat resistance, thermal shrinkage resistance and puncture strength, has better wettability with an electrolyte, and thus can prolong a cycle life of a battery. The coated separator of the meta-aramid with a grid structure can further improve the oxidation resistance, is beneficial to realizing high potential and improves energy density.

3 Claims, 4 Drawing Sheets

META-ARAMID POLYMER WITH GRID STRUCTURE, AND PREPARATION METHOD THEREFOR AND USE THEREOF

CROSS-REFERENCE TO RELATED APPLICATIONS

This application is a continuation of International Patent Application No. PCT/CN2023/096447 with a filing date of May 26, 2023, designating the United States, now pending, and further claims priority to Chinese Patent Application No. 202310152199.9 with a filing date of Feb. 23, 2023. The content of the aforementioned application, including any intervening amendments thereto, is incorporated herein by reference.

TECHNICAL FIELD

The present disclosure belongs to the field of battery separators, particularly relates to a meta-aramid polymer with a grid structure, and a preparation method therefor and use thereof.

BACKGROUND

The vigorous development of new energy electric vehicles promotes the rapid development of the lithium battery industry. The lithium ion battery mainly comprises a positive electrode, a negative electrode, a separator and an electrolyte. The separator is used as one of four main materials in the lithium battery and is used for separating the positive electrode from the negative electrode to prevent the two electrodes from being in contact with each other to cause short circuit. Besides, the separator is used for adsorbing the electrolyte to allow lithium ions to pass through. When overcharging or temperature rising occurs, the separator blocks current conduction through closed holes to prevent explosion. Commercial polyolefin separators cause a series of safety problems due to insufficient heat resistance. A coated separator becomes a main solution of a lithium battery separator for the new energy electric vehicles. Since the ceramic coated separator in current mainstream product has some defects, for example, the binding of inorganic materials and organic polymer based materials needs binders, the temperature resistance is influenced, and thus the stability of a ceramic coating at high temperature is further influenced.

In recent years, an aramid fiber coated separator becomes a novel solution for a lithium battery separator. An aramid material is expected to be used as a high-temperature-resistant coated separator by many separator manufacturers. However, a production technology is limited to meta-aramid fiber or para-aramid fiber itself. Even ceramics is mixed in an aramid fiber slurry for coating. For example, the application with the publication number of CN110707265A discloses an aramid fiber coating liquid, a preparation method therefor, a separator based on the aramid fiber coating liquid and use thereof. The meta-aramid fiber and the ceramic are mixed to form a mixed slurry and the ceramic accounts for a large proportion. The mixed slurry is coated on a polyolefin separator. A low thermal shrinkage rate is also guaranteed within 130° C. and the temperature resistance at higher temperature cannot be met. Therefore, it is highly desirable to develop a separator and a preparation method therefor.

SUMMARY

The present disclosure provides a meta-aramid polymer with a grid structure and a preparation method therefor and use thereof, aiming at solving the defects of high temperature resistance, thermal shrinkage resistance and puncture strength of a coated separator in the prior art. The coated separator has good high temperature resistance, thermal shrinkage resistance, puncture strength and oxidation resistance, which is beneficial to realizing high potential, improves energy density and safety, has better wettability with an electrolyte, and can prolong a cycle life of a battery. The coated separator prepared from the meta-aramid polymer with a grid structure is suitable for lithium batteries used in electric vehicles. The related preparation method is time-saving and labor-saving, and has high production efficiency. The product has high quality and good stability.

The present disclosure is realized by the following technical solutions:

In a first aspect, the present disclosure provides a meta-aramid polymer with a grid structure whose structural formula is as follows:

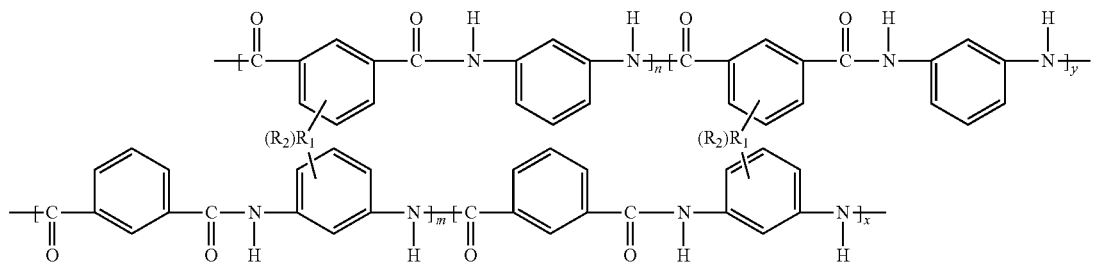

wherein m, n, x and y represent polymerization degrees; each of $R_1$ and $R_2$ is alkyl groups with 3-5 carbon atoms.

In a second aspect, the present disclosure provides a method for preparing a meta-aramid polymer with a grid structure. The reaction process is as follows:

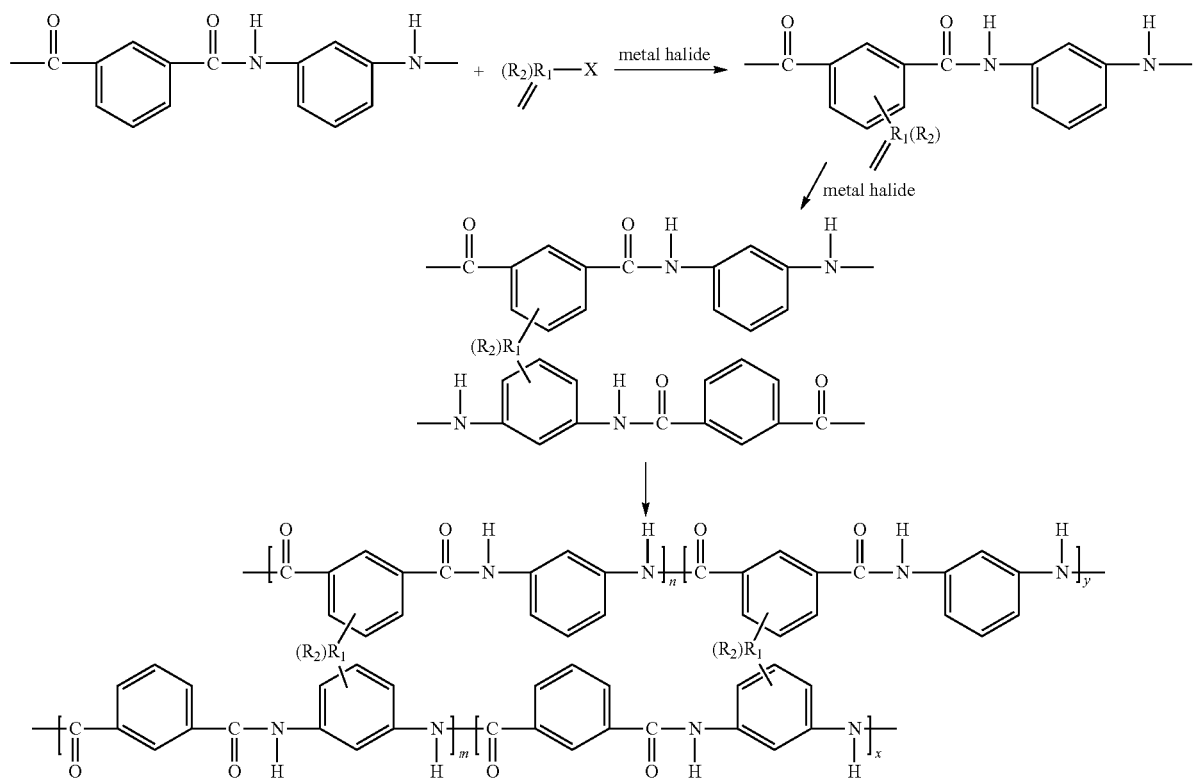

wherein m, n, x and y represent polymerization degrees; each of $R_1$ and $R_2$ is alkyl groups with 3-5 carbon atoms.

In a third aspect, the preparation process of the method for preparing a meta-aramid polymer with a grid structure is as follows:

(1) Polycondensation: preparing a meta-aramid polymer by using solution polymerization, namely, dissolving m-phenylenediamine (MPD) in an organic solvent, then adding isophthaloyl chloride (IPC) into a solution in 4 stages for polycondensation, independently 1st polycondensation stage, 2nd polycondensation stage, 3rd polycondensation stage and 4th polycondensation stage, adding an alkylating agent and a metal halide in the 1st and 2nd polycondensation stages, and controlling the reaction temperature, the stirring speed, reaction time and the system viscosity of each stage so as to obtain a prepared polymer solution comprising a polymer molecular structure with a grid structure;

(2) Washing: washing the prepared polymer solution in an aqueous solvent, and removing an oligomer and the metal salt in the polymer by water washing for 3 times so as to obtain the meta-aramid polymer with a grid structure.

Further, when the m-phenylenediamine (MPD) is dissolved in the organic solvent, the solution is kept at 0-10° C., the isophthaloyl chloride (IPC) is divided into 4 equal parts by weight and added into a system in 4 stages for the polycondensation, namely polycondensation 1, polycondensation 2, polycondensation 3 and polycondensation 4 respectively.

The reaction temperature of the polycondensation 1 is 5-10° C., the stirring speed is 500-1,000 r/min, the alkylating agent and the metal halide are added, the reaction time is 30-60 min, a neutralizing agent is added, a reaction byproduct is removed, and the system viscosity is 100-300 mPa·s after the polycondensation 1 is completed;

the reaction temperature of the polycondensation 2 is 10-30° C., the stirring speed is 500-700 r/min, the alkylating agent is added again, the reaction time is 30-45 min, the neutralizing agent is added, a reaction byproduct of this stage is removed, and the system viscosity is 500-1,000 mPa·s after the polycondensation 2 is completed;

the reaction temperature of the polycondensation 3 is 25-45° C., the stirring speed is 200-350 r/min, the reaction time is 15-20 min, and the system viscosity is 2,000-3,000 mPa·s after the polycondensation 3 is completed; and the reaction temperature of the polycondensation 4 is 40-55° C., the stirring speed is 80-200 r/min, the reaction time is 10-30 min, and the system viscosity is 100,000-150,000 mPa·s after the polycondensation 4 is completed.

Further, the organic solvent is one of N,N-dimethylacetamide (DMAc), N,N-dimethylformamide (DMF), N-methylpyrrolidone (NMP) and dimethylsulfoxide (DMSO); the alkylating agent is chloro or bromo alkylolefin, wherein the number of carbon atoms is an integer of from 3 to 5; the metal halide is one of $AlCl_3$, $FeCl_3$, $SbCl_5$ and $SnCl_4$; the neutralizing agent is one of ammonia, calcium hydroxide, calcium oxide and sodium hydroxide; and the aqueous solvent comprises one of deionized water and a mixture of deionized water and a polymerization solvent.

Further, representative substances of the chemical structural formula of the alkylating agent are the following substances, but are not limited to the following substances:

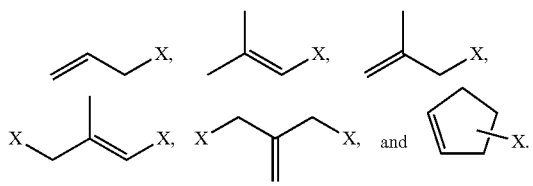

Further, the molar ratio of the MPD to the IPC is 1:(1-1.05); the content of the polymer after the polycondensation is completed is 11-35 wt %; the molar equivalent ratio of the neutralizing agent to the IPC is 1:1; the molar ratio of the total mole of the alkylating agents in the polycondensation 1 and the polycondensation 2 to the mole of the MPD is (1-20):(180-199), and the alkylating agents are added in equal parts respectively in the processes of the polycondensation 1 and the polycondensation 2; and the addition amount of the metal halide accounts for 0.1-0.6 wt % of the mass of the whole reaction system.

In the fourth aspect, the present disclosure provides use of the meta-aramid polymer with a grid structure in the preparation of a lithium battery coated separator.

Further, the meta-aramid polymer with a grid structure, a pore-forming agent and a cosolvent are dissolved in the organic solvent to form a coating slurry, the coating slurry is extruded through a die head, the slurry is coated on one side or two sides of a polyolefin separator, the coated separator is formed in a coagulating bath, and is water washed and dried so as to obtain the lithium battery coated separator of the meta-aramid polymer with a grid structure.

Further, the mass ratio of the meta-aramid polymer with a grid structure, the pore-forming agent, the cosolvent and the organic solvent is (2-8):(2-6):(1-8):(78-95); the pore-forming agent is one of polyethylene glycol (PEG) and polyvinylpyrrolidone (PVP); the cosolvent is one of calcium chloride and lithium chloride; the polyolefin separator is one of polyethylene and polypropylene separators; the coating mode is one of microgravure roll coating, comma roll coating and slit type extrusion coating; an organic solvent in the coagulating bath is one or several of N,N-dimethylacetamide (DMAc), N,N-dimethylformamide (DMF), N-methylpyrrolidone (NMP) and dimethylsulfoxide (DMSO), the concentration of a bath solution in the coagulating bath is 20-65%, and a temperature of the bath solution is 5-45° C.; a temperature of the water washing is 45-65° C.; and a temperature of the drying is 120-155° C.

Compared with the prior art, the present disclosure has the following beneficial technical effects:

(1) C alkylation is performed in the process of forming meta-aramid, such that adjacent molecular structures are linked by a chemical bond so as to form a grid structure, and thus the problem of gel phenomenon caused by large crosslinking degree is solved while the crosslinking degree is improved.

(2) The separator prepared by coating the meta-aramid polymer with a grid structure on the surface of the polyolefin porous separator has higher puncture strength, heat resistance and thermodynamic properties. It improves the puncture strength by 20% or greater, has a fusing temperature greater than 250° C. and a thermal shrinkage rate lower than 3%, increases a ventilation value by 15 s/100 cc or more, and has the tensile strength greater than 150 MPa and an elongation rate of 100% or greater.

(3) The surface of the coated separator of the meta-aramid with a grid structure obviously improves the wettability of an electrolyte. The separator is beneficial to prolonging a cycle life of a lithium battery, can also improve the oxidation resistance, is beneficial to realizing high potential and improves energy density.

BRIEF DESCRIPTION OF DRAWINGS

The following describes the present disclosure in further detail with reference to the accompanying drawings.

DETAILED DESCRIPTION

Figure 1:
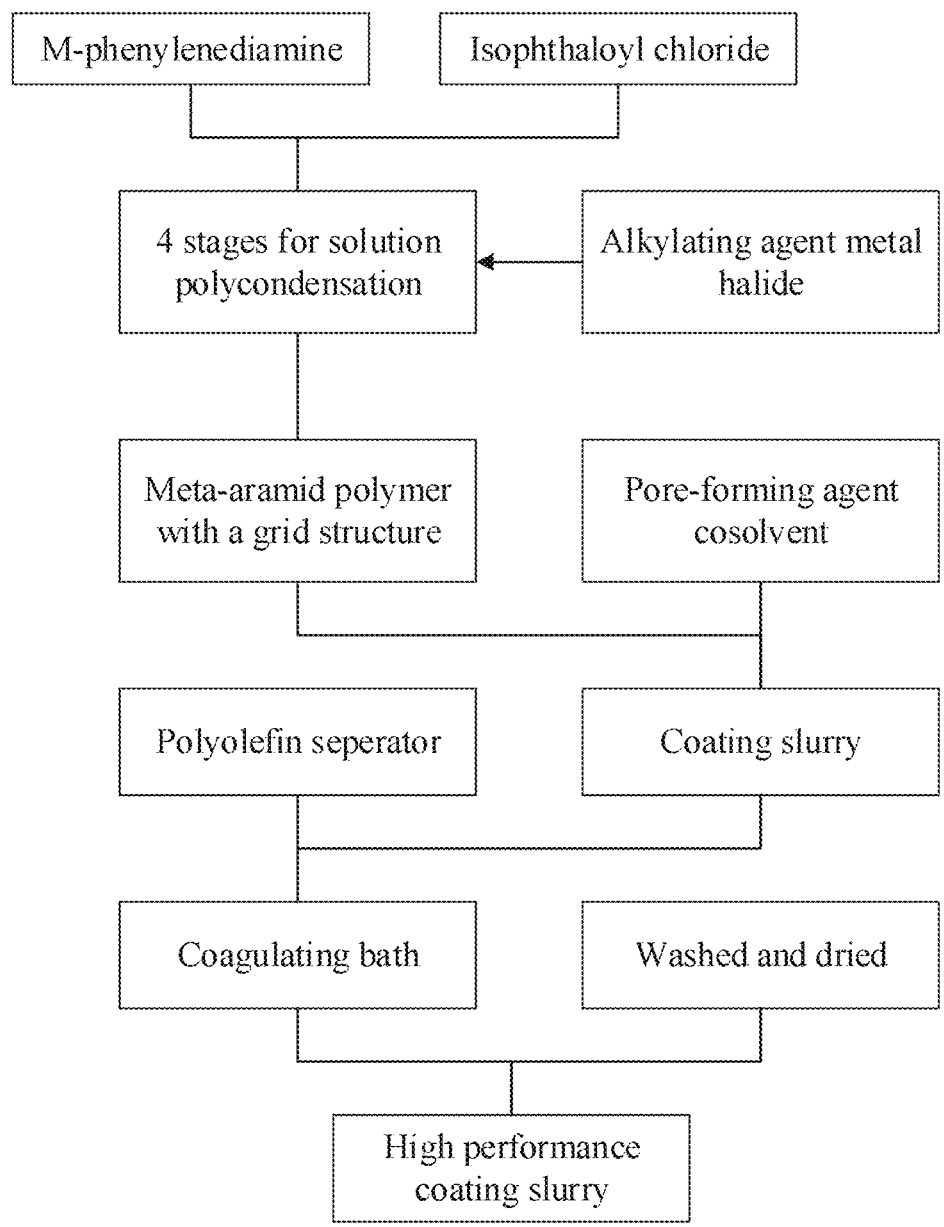
FIG. 1 is a flow diagram of a preparation process of the present disclosure.
Figure 2:
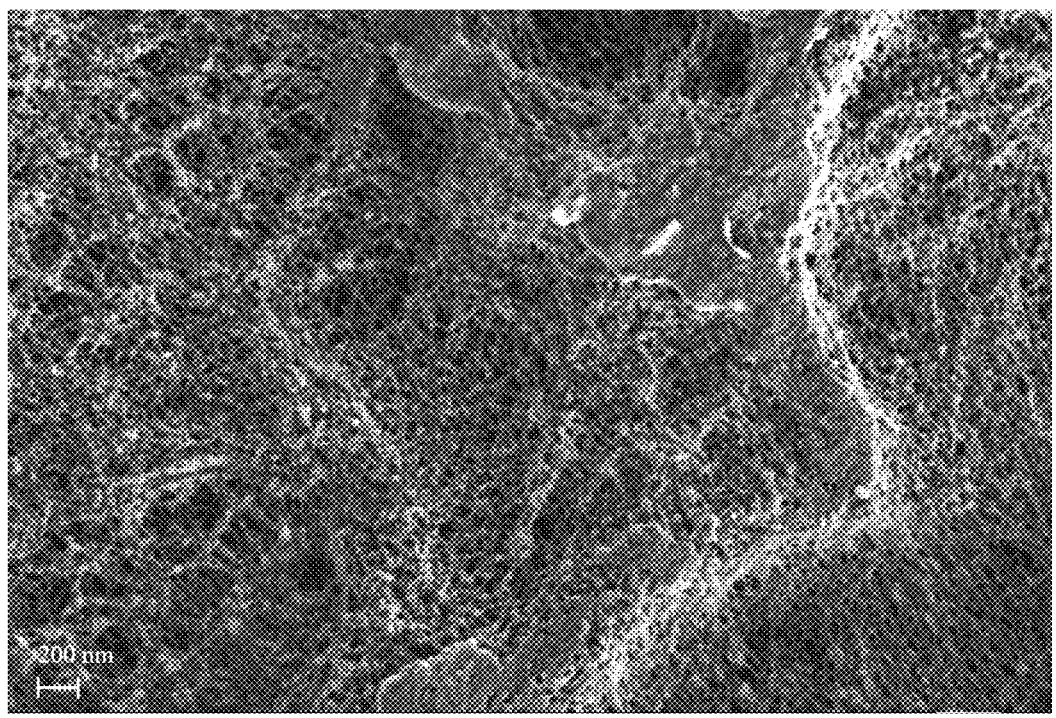
FIG. 2 is an SEM image of a coated separator of meta-aramid with a grid structure prepared in example 1.
Figure 3:
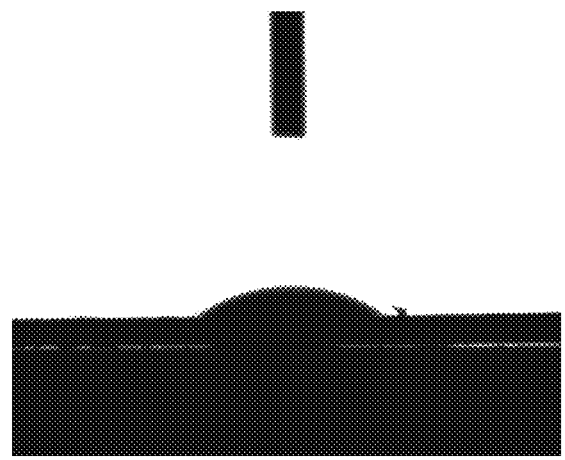
FIG. 3 is a photograph of a contact angle of an electrolyte of the coated separator of example 1.
Figure 4:
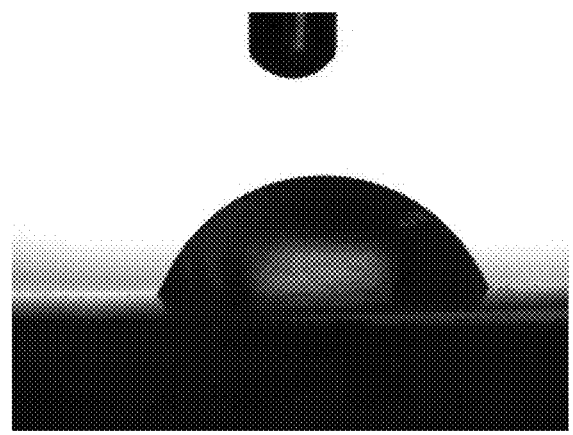
FIG. 4 is a photograph of a contact angle of an electrolyte of a polyethylene separator of comparative example.

The present disclosure will be described below with reference to the examples. The examples are only intended to explain the present disclosure, but not to limit the scope of the present disclosure.

Example 1

8.2 kg of MPD was dissolved in 82 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of AlCl₃ were added, wherein reaction time was 45 min, then calcium hydroxide was added to remove hydrogen chloride produced by the reaction, wherein a system viscosity was 189 mPa·s; then polycondensation 2 was performed, the reaction temperature was controlled at 22° C., wherein the stirring speed was 500 r/min, 196.5 g of the allyl chloride was added, wherein the reaction time was 30 min, then the calcium hydroxide was added to remove the hydrogen chloride produced by the reaction, wherein the system viscosity was 695 mPa·s; then the IPC was continuously added for polycondensation 3, the reaction temperature was controlled at 36° C., wherein the stirring speed was 220 r/min, the reaction time was 20 min and the system viscosity was 2,246 mPa·s; then the last IPC was added for polycondensation 4, the reaction temperature was controlled at 45° C., wherein the stirring speed was 120 r/min and the reaction was 25 min, the whole polycondensation was completed, the system viscosity reached 125,000 m·Pas, the calcium hydroxide was added for neutralization, and a viscosity of a polymer solution was 105,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 2

8.2 kg of MPD was dissolved in 82 kg of DMAc, a temperature was kept at 8° C. after the complete dissolution, IPC was started to be added in stages for polycondensation, a reaction temperature was controlled at 8° C. in the process of polycondensation 1, wherein a stirring speed was 800 r/min, 14.5 g of allyl chloride and 200 g of $AlCl_3$ were added, wherein reaction time was 45 min, then calcium hydroxide was added to remove hydrogen chloride produced by the reaction, wherein a system viscosity was 151 mPa·s; then polycondensation 2 was performed, the reaction temperature was controlled at 22° C., wherein the stirring speed was 500 r/min, 14.5 g of the allyl chloride was added, wherein the reaction time was 30 min, then the calcium hydroxide was added to remove the hydrogen chloride produced by the reaction, wherein the system viscosity was 701 mPa·s; then the IPC was continuously added for polycondensation 3, the reaction temperature was controlled at 36° C., wherein the stirring speed was 220 r/min, the reaction time was 20 min and the system viscosity was 2,316 mPa·s; then the last IPC was added for polycondensation 4, the reaction temperature was controlled at 45° C., wherein the stirring speed was 120 r/min and the reaction was 25 min, the whole polycondensation was completed, the system viscosity reached 121,000 mPa·s, then the calcium hydroxide was added for neutralization, and a viscosity of a polymer solution was 101,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 3

8.2 kg of MPD was dissolved in 82 kg of DMAc, a temperature was kept at 8° C. after the complete dissolution, IPC was started to be added in stages for polycondensation, a reaction temperature was controlled at 8° C. in the process of polycondensation 1, wherein a stirring speed was 800 r/min, 289.3 g of allyl chloride and 200 g of $AlCl_3$ were added, wherein reaction time was 45 min, then calcium hydroxide was added to remove hydrogen chloride produced by the reaction, wherein a system viscosity was 213 mPa·s; then polycondensation 2 was performed, the reaction temperature was controlled at 22° C., wherein the stirring speed was 500 r/min, 289.3 g of the allyl chloride was added, wherein the reaction time was 30 min, then the calcium hydroxide was added to remove the hydrogen chloride produced by the reaction, wherein the system viscosity was 712 mPa·s; then the IPC was continuously added for polycondensation 3, the reaction temperature was controlled at 36° C., wherein the stirring speed was 220 r/min, the reaction time was 20 min and the system viscosity was 2,446 mPa·s; then the last IPC was added for polycondensation 4, the reaction temperature was controlled at 45° C., wherein the stirring speed was 120 r/min and the reaction was 25 min, the whole polycondensation was completed, the system viscosity reached 135,000 mPa·s, then the calcium hydroxide was added for neutralization, and a viscosity of a polymer solution was 113,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 4

5.0 kg of MPD was dissolved in 89 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 120.2 g of allyl chloride and 200 g of $AlCl_3$ were added, wherein reaction time was 45 min, then calcium hydroxide was added to remove hydrogen chloride produced by the reaction, wherein a system viscosity was 149 mPa·s; then polycondensation 2 was performed, the reaction temperature was controlled at 22° C., wherein the stirring speed was 500 r/min, 120.2 g of the allyl chloride was added, wherein the reaction time was 30 min, then the calcium hydroxide was added to remove the hydrogen chloride produced by the reaction, wherein the system viscosity was 595 mPa·s; then the IPC was continuously added for polycondensation 3, the reaction temperature was controlled at 36° C., wherein the stirring speed was 220 r/min, the reaction time was 20 min and the system viscosity was 1,846 mPa·s; then the last IPC was added for polycondensation 4, the reaction temperature was controlled at 45° C., wherein the stirring speed was 120 r/min and the reaction was 25 min, the whole polycondensation was completed, the system viscosity reached 101,000 mPa·s, the calcium hydroxide was added for neutralization, and a viscosity of a polymer solution was 85,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 5

15.9 kg of MPD was dissolved in 65 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 382.5 g of allyl chloride and 200 g of $AlCl_3$ were added, wherein reaction time was 45 min, then calcium hydroxide was added to remove hydrogen chloride produced by the reaction, wherein a system viscosity was 210 mPa·s; then polycondensation 2 was performed, the reaction temperature was controlled at 22° C., wherein the stirring speed was 500 r/min, 382.5 g of the allyl chloride was added, wherein the reaction time was 30 min, then the calcium hydroxide was added to remove the hydrogen chloride produced by the reaction, wherein the system viscosity was 701 mPa·s; then the IPC was continuously added for polycondensation 3, the reaction temperature was controlled at 36° C., wherein the stirring speed was 220 r/min, the reaction time was 20 min and the system viscosity was 2,446 mPa·s; then the last IPC was added for polycondensation 4, the reaction temperature was controlled at 45° C., wherein the stirring speed was 120 r/min and the reaction was 25 min, the whole polycondensation was completed, the system viscosity reached 145,000 mPa·s, then the calcium hydroxide was added for neutralization, and a viscosity of a polymer solution was 120,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 6

8.2 kg of MPD was dissolved in 82 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of $AlCl_3$ were added, wherein reaction time was 45 min, then calcium hydroxide was added to remove hydrogen chloride produced by the reaction, wherein a system viscosity was 178 mPa·s; then polycondensation 2 was performed, the reaction temperature was controlled at 22° C., wherein the stirring speed was 500 r/min, 196.5 g of the allyl chloride was added, wherein the reaction time was 30 min, then the calcium hydroxide was added to remove the hydrogen chloride produced by the reaction, wherein the system viscosity was 688 mPa·s; then the IPC was continuously added for polycondensation 3, the reaction temperature was controlled at 36° C., wherein the stirring speed was 220 r/min, the reaction time was 20 min and the system viscosity was 2,301 mPa·s; then the last IPC was added for polycondensation 4, the reaction temperature was controlled at 45° C., wherein the stirring speed was 120 r/min and the reaction was 25 min, the whole polycondensation was completed, the system viscosity reached 120,000 mPa·s, the calcium hydroxide was added for neutralization, and a viscosity of a polymer solution was 100,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 2:2:1:95, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 7

8.2 kg of MPD was dissolved in 82 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of AlCl$_3$ were added, wherein reaction time was 45 min, then calcium hydroxide was added to remove hydrogen chloride produced by the reaction, wherein a system viscosity was 201 mPa·s; then polycondensation 2 was performed, the reaction temperature was controlled at 22° C., wherein the stirring speed was 500 r/min, 196.5 g of the allyl chloride was added, wherein the reaction time was 30 min, then the calcium hydroxide was added to remove the hydrogen chloride produced by the reaction, wherein the system viscosity was 699 mPa·s; then the IPC was continuously added for polycondensation 3, the reaction temperature was controlled at 36° C., wherein the stirring speed was 220 r/min, the reaction time was 20 min and the system viscosity was 2,312 mPa·s; then the last IPC was added for polycondensation 4, the reaction temperature was controlled at 45° C., wherein the stirring speed was 120 r/min and the reaction was 25 min, the whole polycondensation was completed, the system viscosity reached 130,000 mPa·s, the calcium hydroxide was added for neutralization, and a viscosity of a polymer solution was 109,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 8:6:8:78, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 8

8.2 kg of MPD was dissolved in 82 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of AlCl$_3$ were added, wherein reaction time was 45 min, then calcium hydroxide was added to remove hydrogen chloride produced by the reaction, wherein a system viscosity was 202 mPa·s; then polycondensation 2 was performed, the reaction temperature was controlled at 22° C., wherein the stirring speed was 500 r/min, 196.5 g of the allyl chloride was added, wherein the reaction time was 30 min, then the calcium hydroxide was added to remove the hydrogen chloride produced by the reaction, wherein the system viscosity was 685 mPa·s; then the IPC was continuously added for polycondensation 3, the reaction temperature was controlled at 36° C., wherein the stirring speed was 220 r/min, the reaction time was 20 min and the system viscosity was 2,100 mPa·s; then the last IPC was added for polycondensation 4, the reaction temperature was controlled at 45° C., wherein the stirring speed was 120 r/min and the reaction was 25 min, the whole polycondensation was completed, the system viscosity reached 115,000 mPa·s, the calcium hydroxide was added for neutralization, and a viscosity of a polymer solution was 95,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 20% and a temperature was 5° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 9

8.2 kg of MPD was dissolved in 82 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of AlCl$_3$ were added, wherein reaction time was 45 min, then calcium hydroxide was added to remove hydrogen chloride produced by the reaction, wherein a system viscosity was 191 mPa·s; then polycondensation 2 was performed, the reaction temperature was controlled at 22° C., wherein the stirring speed was 500 r/min, 196.5 g of the allyl chloride was added, wherein the reaction time was 30 min, then the calcium hydroxide was added to remove the hydrogen chloride produced by the reaction, wherein the system viscosity was 500 mPa·s; then the IPC was continuously added for polycondensation 3, the reaction temperature was controlled at 36° C., wherein the stirring speed was 220 r/min, the reaction time was 20 min and the system viscosity was 2,220 mPa·s; then the last IPC was added for polycondensation 4, the reaction temperature was controlled at 45° C., wherein the stirring speed was 120 r/min and the reaction was 25 min, the whole polycondensation was completed, the system viscosity reached 131,000 mPa·s, the calcium hydroxide was added for neutralization, and a viscosity of a polymer solution was 111,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 65% and a temperature was 45° C. The separator was taken out from the coagulating tank, washed with water at 45° C., and immediately dried at a temperature of 155° C. The separator was rolled so as to obtain a meta-aramid coated polyethylene separator with the thickness of each of two coatings of 2 μm.

Example 10

8.2 kg of MPD was dissolved in 82 kg of DMF, a temperature was kept at 5° C. after the complete dissolution, IPC was started to be added in stages for polycondensation, a reaction temperature was controlled at 8° C. in the process of polycondensation 1, wherein a stirring speed was 1,000 r/min, 232.7 g of methyl allyl chloride and 200 g of FeCl$_3$ were added, wherein reaction time was 30 min, then calcium hydroxide was added to remove hydrogen chloride produced by the reaction, wherein a system viscosity was 100 mPa·s; then polycondensation 2 was performed, the reaction temperature was controlled at 22° C., wherein the stirring speed was 500 r/min, 232.7 g of the methyl allyl chloride was added, wherein the reaction time was 30 min, then the calcium hydroxide was added to remove the hydrogen chloride produced by the reaction, wherein the system viscosity was 679 mPa·s; then the IPC was continuously added for polycondensation 3, the reaction temperature was controlled at 36° C., wherein the stirring speed was 220 r/min, the reaction time was 20 min and the system viscosity was 2,000 mPa·s; then the last IPC was added for polycondensation 4, the reaction temperature was controlled at 45° C., wherein the stirring speed was 120 r/min and the reaction was 25 min, the whole polycondensation was completed, the system viscosity reached 100,000 mPa·s, the calcium hydroxide was added for neutralization, and a viscosity of a polymer solution was 81,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMF according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMF), wherein the concentration of a bath solution was 65% and a temperature was 45° C. The separator was taken out from the coagulating tank, washed with water at 55° C., and immediately dried at a temperature of 120° C. The separator was rolled so as to obtain a meta-aramid coated polyethylene separator with the thickness of each of two coatings of 2 μm.

Example 11

8.2 kg of MPD was dissolved in 82 kg of NMP, a temperature was kept at 10° C. after the complete dissolution, IPC was started to be added in stages for polycondensation, a reaction temperature was controlled at 10° C. in the process of polycondensation 1, wherein a stirring speed was 700 r/min, 196.5 g of allyl chloride and 200 g of AlCl$_3$ were added, wherein reaction time was 60 min, then calcium hydroxide was added to remove hydrogen chloride produced by the reaction, wherein a system viscosity was 300 mPa·s; then polycondensation 2 was performed, the reaction temperature was controlled at 30° C., wherein the stirring speed was 500 r/min, 196.5 g of the allyl chloride was added, wherein the reaction time was 30 min, then the calcium hydroxide was added to remove the hydrogen chloride produced by the reaction, wherein the system viscosity was 669 mPa·s; then the IPC was continuously added for polycondensation 3, the reaction temperature was controlled at 42° C., wherein the stirring speed was 220 r/min, the reaction time was 20 min and the system viscosity was 2,009 mPa·s; then the last IPC was added for polycondensation 4, the reaction temperature was controlled at 50° C., wherein the stirring speed was 120 r/min and the reaction was 25 min, the whole polycondensation was completed, the system viscosity reached 120,000 mPa·s, the calcium hydroxide was added for neutralization, and a viscosity of a polymer solution was 81,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the NMP according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and NMP), wherein the concentration of a bath solution was 65% and a temperature was 45° C. The separator was taken out from the coagulating tank, washed with water at 65° C., and immediately dried at a temperature of 145° C. The separator was rolled so as to obtain a meta-aramid coated polyethylene separator with the thickness of each of two coatings of 2 μm.

Example 12

8.2 kg of MPD was dissolved in 82 kg of DMSO, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of AlCl$_3$ were added, wherein reaction time was 45 min, then calcium hydroxide was added to remove hydrogen chloride produced by the reaction, wherein a system viscosity was 171 mPa·s; then polycondensation 2 was performed, the reaction temperature was controlled at 22° C., wherein the stirring speed was 600 r/min, 196.5 g of the allyl chloride was added, wherein the reaction time was 30 min, then the calcium hydroxide was added to remove the hydrogen chloride produced by the reaction, wherein the system viscosity was 721 mPa·s; then the IPC was continuously added for polycondensation 3, the reaction temperature was controlled at 36° C., wherein the stirring speed was 220 r/min, the reaction time was 20 min and the system viscosity was 2,349 mPa·s; then the last IPC was added for polycondensation 4, the reaction temperature was controlled at 50° C., wherein the stirring speed was 120 r/min and the reaction was 25 min, the whole polycondensation was completed, the system viscosity reached 150,000 mPa·s, the calcium hydroxide was added for neutralization, and a viscosity of a polymer solution was 130,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMSO according to the mass ratio of 5:3:5:87, then the slurry was uniformly coated on a polyethylene separator with the thickness of 9 μm by using microgravure coating, and then the separator was fed into a coagulating bath tank (a coagulating bath was a solution of water and DMSO), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 13

8.2 kg of MPD was dissolved in 82 kg of DMAc, a temperature was kept at 5° C. after the complete dissolution, IPC was started to be added in stages for polycondensation, a reaction temperature was controlled at 8° C. in the process of polycondensation 1, wherein a stirring speed was 800 r/min, 196.5 g of allyl chloride and 200 g of $AlCl_3$ were added, wherein reaction time was 45 min, then calcium hydroxide was added to remove hydrogen chloride produced by the reaction, wherein a system viscosity was 178 mPa·s; then polycondensation 2 was performed, the reaction temperature was controlled at 10° C., wherein the stirring speed was 700 r/min, 196.5 g of the allyl chloride was added, wherein the reaction time was 45 min, then the calcium hydroxide was added to remove the hydrogen chloride produced by the reaction, wherein the system viscosity was 1,000 mPa·s; then the IPC was continuously added for polycondensation 3, the reaction temperature was controlled at 36° C., wherein the stirring speed was 220 r/min, the reaction time was 15 min and the system viscosity was 3,000 mPa·s; then the last IPC was added for polycondensation 4, the reaction temperature was controlled at 55° C., wherein the stirring speed was 80 r/min and the reaction was 25 min, the whole polycondensation was completed, the system viscosity reached 119,000 mPa·s, the calcium hydroxide was added for neutralization, and a viscosity of a polymer solution was 100,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PEG, lithium chloride and the DMAc according to the mass ratio of 2:2:1:95, then the slurry was uniformly coated on a polyethylene separator with the thickness of 9 μm by using microgravure coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 14

8.2 kg of MPD was dissolved in 82 kg of DMAc, a temperature was kept at 5° C. after the complete dissolution, IPC was started to be added in stages for polycondensation, a reaction temperature was controlled at 5° C. in the process of polycondensation 1, wherein a stirring speed was 800 r/min, 196.5 g of allyl chloride and 200 g of $SnCl_4$ were added, wherein reaction time was 45 min, then ammonia was introduced to remove hydrogen chloride produced by the reaction, wherein a system viscosity was 201 mPa·s; then polycondensation 2 was performed after filtration, the reaction temperature was controlled at 10° C., wherein the stirring speed was 700 r/min, 196.5 g of allyl chloride was added, wherein the reaction time was 45 min, then calcium hydroxide was added to remove the hydrogen chloride produced by the reaction, wherein the system viscosity was 870 mPa·s; then the IPC was continuously added for polycondensation 3, the reaction temperature was controlled at 25° C., wherein the stirring speed was 350 r/min, the reaction time was 15 min and the system viscosity was 2,980 mPa·s; then the last IPC was added for polycondensation 4, the reaction temperature was controlled at 40° C., wherein the stirring speed was 200 r/min and the reaction was 10 min, the whole polycondensation was completed, the system viscosity reached 107,000 mPa·s, the calcium hydroxide was added for neutralization, and a viscosity of a polymer solution was 90,000 mPa·s after the neutralization was completed so as to obtain a solution of a meta-aramid polymer with a grid structure.

The prepared polymer solution after the polymerization was completed was mixed with deionized water, after the polymer was completely separated out, then the polymer was washed for 3 times by using the deionized water, then the polymer was dried by using a fan to remove moisture, and an obtained solid polymer material was sealed at a dark place for later use.

A coating slurry was prepared from the meta-aramid polymer with a grid structure, PVP, lithium chloride and the DMAc according to the mass ratio of 2:2:1:95, then the slurry was uniformly coated on a polyethylene separator with the thickness of 9 μm by using slit type extrusion coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Example 15

8.2 kg of MPD was dissolved in 82 kg of DMAc, a temperature was kept at 0° C. after the complete dissolution, IPC was started to be added in stages for polycondensation, a reaction temperature was controlled at 8° C. in the process of polycondensation 1, wherein a stirring speed was 500 r/min, 196.5 g of 3-bromo-1-propene and 200 g of $SbCl_5$ were added, wherein reaction time was 45 min, then calcium oxide was added to remove hydrogen chloride produced by the reaction, wherein a system viscosity was 170 mPa·s; then polycondensation 2 was performed, the reaction temperature was controlled at 15° C., wherein the stirring speed was 700 r/min, 196.5 g of allyl chloride was added, wherein the reaction time was 45 min, then the calcium oxide was added to remove hydrogen chloride produced by the reaction, wherein the system viscosity was 801 mPa·s; then the IPC was continuously added for polycondensation 3, the reaction temperature was controlled at 45° C., wherein the stirring speed was 200 r/min, the reaction time was 15 min and the system viscosity was 2,480 mPa·s; then the last IPC was added for polycondensation 4, the reaction temperature was controlled at 45° C., wherein the stirring speed was 80 r/min and the reaction was 30 min, the whole polycondensation was completed, the system viscosity reached 100,000 mPa·s, the calcium oxide was added for neutralization, and a viscosity of a polymer solution was 80,000 mPa·s after the neutralization was completed so as to obtain a solution of a meta-aramid polymer with a grid structure.

The prepared polymer solution after the polymerization was completed was mixed with deionized water, after the polymer was completely separated out, the polymer was washed for 3 times by using the deionized water and the DMAc (the mass ratio of the deionized water to the DMAc was 95%:5%), then the polymer was dried by using a fan to remove moisture, and an obtained solid polymer material was sealed at a dark place for later use.

A coating slurry was prepared from the meta-aramid polymer with a grid structure, PEG, calcium chloride and the DMAc according to the mass ratio of 2:2:1:95, then the slurry was uniformly coated on a polypropylene separator with the thickness of 9 μm by using comma roll coating, and then the separator was fed into a coagulating bath tank (a coagulating bath was a solution of water and DMAc), wherein the concentration of a bath solution was 45% and a temperature was 15° C. The separator was taken out from the coagulating tank, washed with water at 55° C., and immediately dried at a temperature of 145° C. The separator was rolled so as to obtain a meta-aramid coated polyethylene separator with the thickness of each of two coatings of 2 μm.

Comparative Example

The performance requirements of a commercial polyethylene separator product are as follows: the thickness of 13 μm, the tensile strength MD≥160 MPa and TD≥160 MPa, an elongation rate MD≥100% and TD≥100%, a ventilation value of 170±40 s/100 cc, the puncture strength≥5 N, a thermal shrinkage rate at 105° C. for 1 h MD≤3% and TD≤1.5%, and the porosity of 40±2%.

TABLE 1

Comparison of performance data of separators in examples and comparative example

| | Thickness | Tensile strength MPa | | Elongation % | | Ventilation value | Puncture strength | Thermal shinkage rate % (105° C., 1 h) | | Thermal shinkage rate % (108° C., 1 h) | | Porosity | Fusing temperature |
|---|---|---|---|---|---|---|---|---|---|---|---|---|---|
| | μm | MD | TD | MD | TD | s/100 cc | N | MD | TD | MD | TD | % | ° C. |
| Example 1 | 13 | 176 | 165 | 127 | 112 | 206 | 8.1 | 0 | 0 | 1.5 | 1.4 | 45 | 269 |
| Example 2 | 13 | 165 | 159 | 121 | 105 | 215 | 7.0 | 0 | 0 | 2.7 | 2.5 | 44 | 261 |
| Example 3 | 13 | 175 | 162 | 125 | 106 | 221 | 7.6 | 0 | 0 | 1.6 | 1.4 | 41 | 268 |
| Example 4 | 13 | 162 | 158 | 118 | 105 | 211 | 7.1 | 0 | 0 | 2.4 | 2.1 | 43 | 264 |
| Example 5 | 13 | 171 | 168 | 122 | 108 | 228 | 7.5 | 0 | 0 | 1.8 | 1.5 | 42 | 266 |
| Example 6 | 13 | 160 | 154 | 116 | 104 | 209 | 7.2 | 0 | 0 | 2.8 | 2.7 | 44 | 256 |
| Example 7 | 13 | 172 | 164 | 119 | 108 | 231 | 8.0 | 0 | 0 | 1.8 | 1.4 | 41 | 267 |
| Example 8 | 13 | 163 | 158 | 120 | 109 | 221 | 7.8 | 0 | 0 | 2.5 | 2.1 | 43 | 258 |
| Example 9 | 13 | 165 | 156 | 118 | 105 | 216 | 7.5 | 0 | 0 | 2.3 | 2.0 | 40 | 259 |
| Example 10 | 13 | 168 | 159 | 119 | 106 | 220 | 7.6 | 0 | 0 | 2.2 | 1.9 | 42 | 256 |
| Example 11 | 13 | 167 | 155 | 117 | 104 | 216 | 7.4 | 0 | 0 | 2.0 | 2.0 | 41 | 255 |
| Example 12 | 13 | 172 | 166 | 119 | 108 | 211 | 7.0 | 0 | 0 | 2.4 | 2.2 | 42 | 261 |
| Example 13 | 13 | 161 | 157 | 116 | 104 | 211 | 7.1 | 0 | 0 | 2.3 | 2.1 | 41 | 260 |
| Example 14 | 13 | 164 | 159 | 117 | 106 | 213 | 7.3 | 0 | 0 | 2.2 | 1.8 | 42 | 263 |

TABLE 1-continued

Comparison of performance data of separators in examples and comparative example

| | Thickness | Tensile strength MPa | | Elongation % | | Ventilation value | Puncture strength | Thermal shinkage rate % (105° C., 1 h) | | Thermal shinkage rate % (108° C., 1 h) | | Porosity | Fusing temperature |
|---|---|---|---|---|---|---|---|---|---|---|---|---|---|
| | μm | MD | TD | MD | TD | s/100 cc | N | MD | TD | MD | TD | % | ° C. |
| Example 15 | 13 | 169 | 155 | 115 | 110 | 208 | 7.0 | 0 | 0 | 2.4 | 1.9 | 41 | 259 |
| Comparative example | 13 | 168 | 163 | 120 | 110 | 195 | 5.5 | 1.7 | 1.0 | ~ | ~ | 40 | ≤155 |

Note:
"~" indicated that the shrinkage was severe under the condition and cannot be measured.
MD represents machine direction and TD represents transverse direction.

Table 1 showed performance data of the separators of the examples and the comparative example. Test methods of the separator samples obtained in the examples and the comparative example were as follows: the thickness of the separator was tested according to GB/T6672-2001 "Plastics film and sheeting—Determination of thickness by mechanical scanning"; the tensile strength and the elongation rate were tested according to GB/T1040.3-2006 "Plastics—Determination of tensile properties"; the ventilation value was tested according to GB/T1038-2000 "Plastics—Film and sheeting—Determination of gas transmission—Differential-pressure method"; the puncture strength was tested according to the operation according to the relevant regulations of the puncture strength in GB/T10004-2008 "Plastic laminated films and pouches for packaging—Dry lamination and extrusion lamination"; the thermal shrinkage rate was tested according to GB/T13519-2016 "Polyethylene heat-shrinkable film for packaging applications"; the porosity was tested according to GB/T6672-2001 "Plastics film and sheeting—Determination of thickness by mechanical scanning"; and the fusing temperature was tested by a TMA method.

An alkane group was introduced among meta-aramid molecular chains to prepare a meta-aramid polymer with a grid structure. The polymer was used for preparing a slurry to be coated on the surface of a polyethylene separator so as to obtain a battery separator with the coating surface of a fine and dense nano-scale pore structure. The results of the examples showed that the preparation method improved the puncture strength of the separator by 20% or greater and greatly improved the fusing temperature of the separator. Under the condition of 180° C., a polyethylene base film was transparent and shrunk seriously. However, the meta-aramid coating with a grid structure prepared by the present disclosure still kept a good form and the thermal shrinkage rates in the transverse direction and the machine direction can be controlled within 3%. In addition, the surface of the coated separator of the meta-aramid with a grid structure obviously improved the wettability of an electrolyte. The separator is beneficial to prolonging a cycle life of a lithium battery.

The above description is merely preferred examples of the present disclosure and is not intended to limit the present disclosure, and various changes and modifications may be made to the present disclosure by those skilled in the art. Any modifications, equivalent substitutions, improvements and the like made within the spirit and principle of the present disclosure should be included within the protection scope of the present disclosure.

What is claimed is:
1. A meta-aramid polymer with a grid structure whose structural formula is as follows:

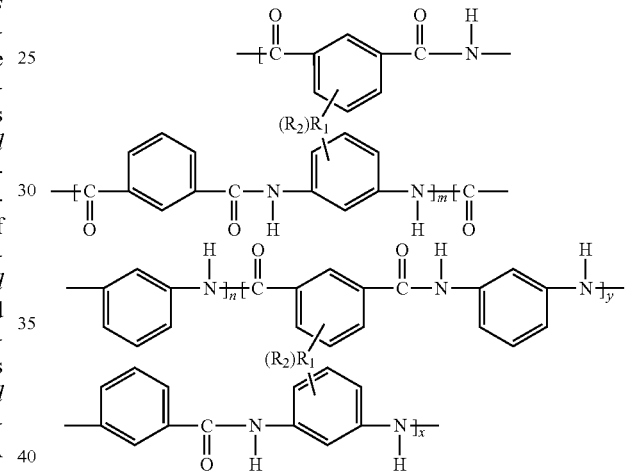

wherein m, n, x and y represent polymerization degrees; each of $R_1$ and $R_2$ is alkyl groups with 3-5 carbon atoms; and wherein the meta-aramid polymer is prepared from a method comprising the following steps:
(1) polycondensation: preparing a meta-aramid polymer by using solution polymerization including dissolving m-phenylenediamine (MPD) in an organic solvent, then adding isophthaloyl chloride (IPC) into a solution in 4 stages for polycondensation, independently 1st polycondensation stage, 2nd polycondensation stage, 3rd polycondensation stage and 4th polycondensation stage, adding an alkylating agent and a metal halide in the 1st and 2nd polycondensation stages, and controlling a reaction temperature, a stirring speed, reaction time and a system viscosity of each stage so as to obtain a prepared polymer solution comprising a polymer molecular structure with a grid structure; and
(2) washing: washing the prepared polymer solution in an aqueous solvent, and removing an oligomer and a metal salt in the polymer by water washing for 3 times so as to obtain the meta-aramid polymer with the grid structure; when the m-phenylenediamine (MPD) is dissolved in the organic solvent, the solution is kept at 0-10° C., the isophthaloyl chloride (IPC) is divided into 4 equal parts by weight and added into a system in the 4 stages for the polycondensation, the polycondensation in the 4 stages is defined as polycondensation 1, polycondensation 2, polycondensation 3 and polycondensation 4 respectively; the reaction temperature of the polycondensation 1 is 5-10° C., the stirring speed is 500-1,000 r/min, the alkylating agent and the metal halide are added, the reaction time is 30-60 min, a neutralizing agent is added, a reaction byproduct is removed, and the system viscosity is 100-300 mPa·s after the polycondensation 1 is completed; the reaction temperature of the polycondensation 2 is 10-30° C., the stirring speed is 500-700 r/min, the alkylating agent is added again, the reaction time is 30-45 min, the neutralizing agent is added, a reaction byproduct of this stage is removed, and the system viscosity is 500-1,000 mPa·s after the polycondensation 2 is completed; the reaction temperature of the polycondensation 3 is 25-45° C., the stirring speed is 200-350 r/min, the reaction time is 15-20 min, and the system viscosity is 2,000-3,000 mPa·s after the polycondensation 3 is completed; and the reaction temperature of the polycondensation 4 is 40-55° C., the stirring speed is 80-200 r/min, the reaction time is 10-30 min, and the system viscosity is 100,000-150,000 mPa·s after the polycondensation 4 is completed; the alkylating agent is chloro or bromo alkylolefin; and the metal halide is one of $AlCl_3$, $FeCl_3$, $SbCl_5$ and $SnCl_4$.

2. The meta-aramid polymer according to claim 1, wherein the organic solvent is one of N,N-dimethylacetamide (DMAc), N,N-dimethylformamide (DMF), N-methylpyrrolidone (NMP) and dimethylsulfoxide (DMSO); the neutralizing agent is one of ammonia, calcium hydroxide and calcium oxide; and the aqueous solvent comprises one of deionized water and a mixture of deionized water and a polymerization solvent.

3. The meta-aramid polymer according to claim 1, wherein a molar ratio of the MPD to the IPC is 1:(1-1.05); a molar equivalent ratio of the neutralizing agent to the IPC is 1:1; a molar ratio of a total mole of the alkylating agents in the polycondensation 1 and the polycondensation 2 to a mole of the MPD is (1-20):(180-199), and the alkylating agents are added in equal parts respectively in the processes of the polycondensation 1 and the polycondensation 2; and the addition amount of the metal halide accounts for 0.1-0.6 wt % of the mass of the whole reaction system.

* * * * *